(12) United States Patent
Chen et al.

(10) Patent No.: US 10,433,137 B2
(45) Date of Patent: Oct. 1, 2019

(54) BLUETOOTH WIFI GATEWAY DEVICE

(71) Applicant: SHENZHEN JBT SMART LIGHTING CO., LTD., Shenzhen, Guangdong (CN)

(72) Inventors: Jinyin Chen, Guangdong (CN); Fei Xiong, Guangdong (CN); Xukai Wang, Guangdong (CN); Wenbin Zhang, Guangdong (CN)

(73) Assignee: SHENZHEN JBT SMART LIGHTING CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/766,688

(22) PCT Filed: May 18, 2017

(86) PCT No.: PCT/CN2017/084872
§ 371 (c)(1),
(2) Date: Apr. 6, 2018

(87) PCT Pub. No.: WO2018/209636
PCT Pub. Date: Nov. 22, 2018

(65) Prior Publication Data
US 2019/0075439 A1    Mar. 7, 2019

(30) Foreign Application Priority Data

May 17, 2017  (CN) .................... 2017 2 0546007 U (51) Int. Cl.
*H04W 4/80* (2018.01)
*H04L 12/66* (2006.01)
(Continued)

(52) U.S. Cl.
CPC ............... *H04W 4/80* (2018.02); *H04L 12/66* (2013.01); *H04W 84/12* (2013.01); *H04W 88/16* (2013.01)

(58) Field of Classification Search
CPC ..... H04W 88/16; H04W 76/15; H04W 76/16; H04W 4/80; H04M 2250/02; H04M 2250/06; H04L 12/66
See application file for complete search history.

(56) References Cited

U.S. PATENT DOCUMENTS

2006/0187954 A1* 8/2006 Braschi ............... H04M 7/0069
370/463
2014/0324527 A1* 10/2014 Kulkarni ........... G06Q 30/0261
705/7.29
(Continued)

OTHER PUBLICATIONS

BleFi—BLE to Wi-Fi IoT Gateway Schematic (Rev. A), May 20, 2016, Texas Instruments (http://www.ti.com/tool/TIDC-BLE-TO-WIFI-IOT-Gateway) (Year: 2016).*
(Continued)

*Primary Examiner* — Devan A Sandiford
(74) *Attorney, Agent, or Firm* — Hamre, Schumann, Mueller & Larson, P.C.

(57) ABSTRACT

The present disclosure provides a Bluetooth WIFI gateway device prcomprising a Bluetooth module, a WIFI module electrically connected to the Bluetooth module, a switch circuit electrically connected to the WIFI module, a first voltage regulation circuit electrically connected to the Bluetooth module, and a second voltage regulation circuit electrically connected to the WIFI module and the switch circuit. The beneficial effect of the present disclosure is that the Bluetooth gateway can receive a Bluetooth signal and transmit a WITI signal by the Bluetooth WIFI gateway device that has simple structure and low cost.

6 Claims, 6 Drawing Sheets

(51) Int. Cl.
  *H04W 84/12* (2009.01)
  *H04W 88/16* (2009.01)

(56) References Cited

U.S. PATENT DOCUMENTS

| | | | |
|---|---|---|---|
| 2017/0063447 A1* | 3/2017 | Wu | H04B 7/24 |
| 2017/0228566 A1* | 8/2017 | Sengstaken, Jr. | G06K 7/10009 |
| 2017/0256155 A1* | 9/2017 | Sengstaken, Jr. | G06F 19/00 |
| 2018/0253727 A1* | 9/2018 | Ortiz | G06Q 20/405 |
| 2018/0279429 A1* | 9/2018 | Sadwick | H05B 33/08 |

OTHER PUBLICATIONS

Srinivas et al., Bluetooth Smart to Wi-Fi IoT Gateway, TIDUA62B, Jul. 2015 (Revised Jan. 2016), Texas Instruments (http://www.ti.com/tool/TIDC-BLE-TO-WIFI-IOT-Gateway) (Year: 2016).*

CC3200 SimpleLink Wi-Fi and Internet-of-Things Solution, a Single-Chip Wireless MCU, SWAS032F, Jul. 2013 (Revised Feb. 2015), Texas Instruments (http://www.ti.com/tool/TIDC-BLE-TO-WIFI-IOT-Gateway) (Year: 2015).*

CC2650 SimpleLink Multistandard Wireless MCU, SWRS158B, Feb. 2015 (Revised Jul. 2016), Texas Instruments (http://www.ti.com/tool/TIDC-BLE-TO-WIFI-IOT-Gateway) (Year: 2016).*

\* cited by examiner

FIG. 8

BLUETOOTH WIFI GATEWAY DEVICE

TECHNICAL FIELD

The present disclosure relates to the field of Bluetooth gateway technology, especially to a Bluetooth WIFI gateway device.

BACKGROUND

With the popularization of the Bluetooth technology, Bluetooth devices have already more and more entered people's life. However, a Bluetooth gateway currently on the market is not very mature. It is difficult for the Bluetooth gateway to receive a Bluetooth signal and transmit a WIFI signal.

Technical Problem

An object of the present disclosure is to provide a Bluetooth WIFI gateway device to solve the problem that a conventional Bluetooth gateway is not very mature and it is difficult for the conventional Bluetooth gateway to receive a Bluetooth signal and transmit a WIFI signal.

Technical Scheme

The technical scheme of the present disclosure is implemented as follows.

The present disclosure provides a Bluetooth WIFI gateway device comprising:
a Bluetooth module;
a WIFI module electrically connected to the Bluetooth module;
a switch circuit electrically connected to the WIFI module;
a first voltage regulation circuit electrically connected to the Bluetooth module; and
a second voltage regulation circuit electrically connected to the WIFI module and the switch circuit.

In the Bluetooth WIFI gateway device according to one embodiment of the present disclosure, the Bluetooth module comprises:
a processing unit;
a Bluetooth chip comprising a Bluetooth voltage regulation interface, a processing unit interface, a Bluetooth asynchronous receive interface, and a Bluetooth asynchronous transmit interface, wherein the Bluetooth voltage regulation interface is electrically connected to the first voltage regulation circuit, the Bluetooth asynchronous receive interface and the Bluetooth asynchronous transmit interface are electrically connected to the WIFI module, and the processing unit interface is electrically connected to the processing unit.

In the Bluetooth WIFI gateway device according to one embodiment of the present disclosure, the WIFI module comprises:
a WIFI antenna;
a WIFI chip comprising a WIFI voltage regulation interface, a WIFI antenna interface, a WIFI asynchronous receive interface, a WIFI asynchronous transmit interface, and a test interface for burning a program, wherein the WIFI voltage regulation interface is electrically connected to the second voltage regulation circuit, the WIFI antenna interface is electrically connected to the WIFI antenna, the WIFI asynchronous receive interface is connected to the Bluetooth asynchronous receive interface, and the WIFI asynchronous transmit interface is connected to the Bluetooth asynchronous transmit interface.

In the Bluetooth WIFI gateway device according to one embodiment of the present disclosure, the Bluetooth WIFI gateway device further comprises a test connection device, wherein the test interface comprises a first clock terminal, a first mode terminal, a first data input terminal, a first data output terminal, and a first reset terminal. The test connection device comprises a second clock terminal, a second mode terminal, a second data input terminal, a second data output terminal, and a second reset terminal. The first clock terminal is connected to the second clock terminal, the first mode terminal is connected to the second mode terminal, the first data input terminal is connected to the second data input terminal, the first data output terminal is connected to the second data output terminal, and the first reset terminal is connected to the second reset terminal.

In the Bluetooth WIFI gateway device according to one embodiment of the present disclosure, the WIFI module further comprises a protection mode interface, a default interface, and a reset interface, the switch circuit comprises:
a switch voltage regulation interface connected to the second voltage regulation circuit;
a protection mode switch connected to the switch voltage regulation interface and the protection mode interface;
a default switch connected to the switch voltage regulation interface and the default interface; and
a reset switch connected to the switch e regulation interface and the reset interface.

In the Bluetooth WIFI gateway device according to one embodiment of the present disclosure, the first voltage regulation circuit comprises:
a first voltage input interface for connecting a predetermined voltage;
a USB interface electrically connected to the first voltage input interface;
a first voltage regulator electrically connected to the USB interface and the first voltage input interface;
a first protection circuit electrically connected to the first voltage regulator; and
a first voltage output interface electrically connected to the first protection circuit and connected to the Bluetooth voltage regulation interface.

In the Bluetooth WIFI gateway device according to one embodiment of the present disclosure, the test connection device further comprises a voltage regulation terminal, the second voltage regulation circuit comprises:
a second voltage input interface for connecting the predetermined voltage;
a second voltage regulator electrically connected to the second voltage input interface;
a first protection circuit electrically connected to the second voltage regulator; and
a second voltage output interface electrically connected to the second protection circuit and connected to the WIFI voltage regulation interface, the switch voltage regulation interface, and the voltage regulation terminal.

In the Bluetooth WIFI gateway device according to one embodiment of the present disclosure, the Bluetooth WIFI gate device further comprises an indicator light module, wherein the WIFI chip further comprises a status interface and a link interface, the indicator light module comprises:
an indicator voltage regulation interface electrically connected to the second voltage output interface;
a first indicator light electrically connected to the indicator voltage regulation interface and the status interface; and a second indicator light electrically connected to the indicator voltage regulation interface and the link interface.

Beneficial Effect

The beneficial effect of the present disclosure is that the Bluetooth gateway can receive the Bluetooth signal and transmit the WIFI signal by the Bluetooth WIFI gateway device that has simple structure and low cost.

BRIEF DESCRIPTION OF THE DRAWINGS

The present disclosure will now be further described with reference to the accompanying drawings and embodiments, in which.

DETAILED DESCRIPTION

For a clear understanding of the technical features, objects and effects of the present disclosure, specific embodiments of the present disclosure will now be described in detail with reference to the accompanying drawings. It is to be understood that the following description is merely exemplary embodiments of the present disclosure, and is not intended to limit the scope of the present disclosure.

A Bluetooth WIFI gateway device 100 is provided in the present disclosure. An object of the present disclosure is to enable a Bluetooth gateway to receive a Bluetooth signal and transmit a WIFI signal by the Bluetooth WIFI gateway device 100 having a simple structure and a low cost.

Figure 1:
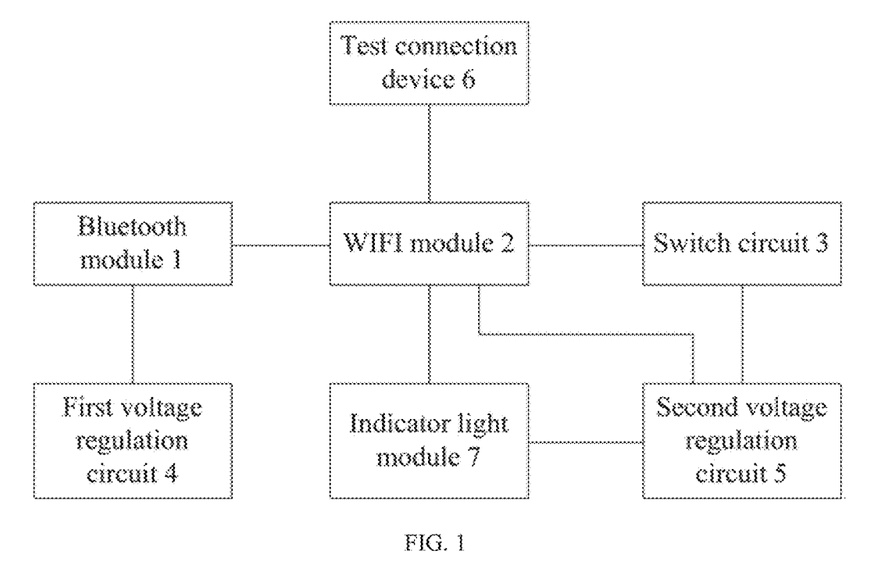
FIG. 1 is a block diagram of a Bluetooth WIFI gateway device according to one embodiment of the present disclosure.

Referring to FIG. 1, FIG. 1 is a block diagram of the Bluetooth WIFI gateway device 100 according to one embodiment of the present disclosure. The Bluetooth WIFI gateway device 100 includes a Bluetooth module 1, a WIFI module 2, a switch circuit 3, a first voltage regulation circuit 4, a second voltage regulation circuit 5, a test connection device 6, and an indicator light module 7.

Figure 2:
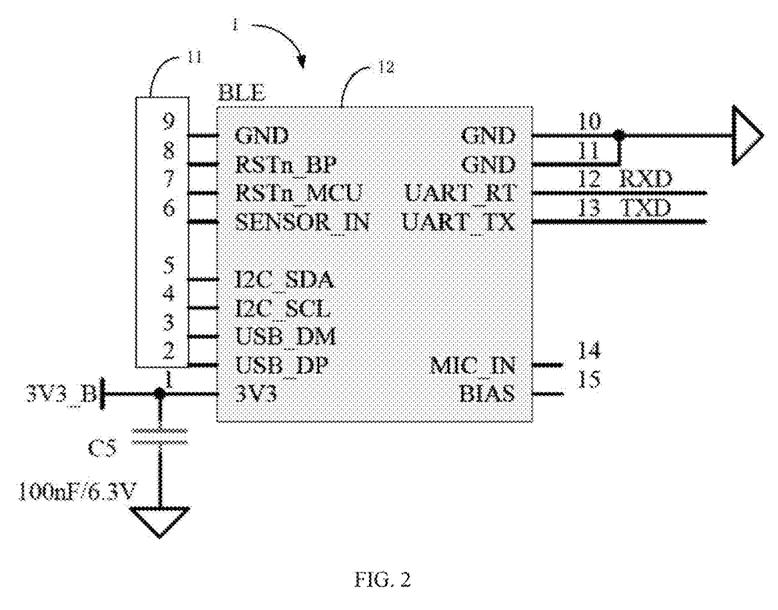
FIG. 2 is a schematic diagram of a Bluetooth module according to one embodiment of the present disclosure.

Referring to FIG. 2, FIG. 2 is a schematic diagram of the Bluetooth module 1 according to one embodiment of the present disclosure. The Bluetooth module 1 includes a processing unit 11 and a Bluetooth chip 12. The Bluetooth chip 12 includes a Bluetooth voltage regulation interface 3V3, processing unit interfaces 1 to 9, a Bluetooth asynchronous receive interface RXD, and a Bluetooth asynchronous transmit interface TXD. The Bluetooth voltage regulation interface 3V3 is electrically connected to the first voltage regulation circuit 4. The Bluetooth asynchronous receive interface RXD and the Bluetooth asynchronous transmit interface TXD are electrically connected to the WIFI module 2. The processing unit interfaces 1 to 9 are electrically connected to the processing unit 11. The processing unit 11 is preferably a MCU (Microcontroller Unit). The receiving of the Bluetooth signal is controlled by the MCU to convert the Bluetooth signal to the WIFI signal.

Figure 3:
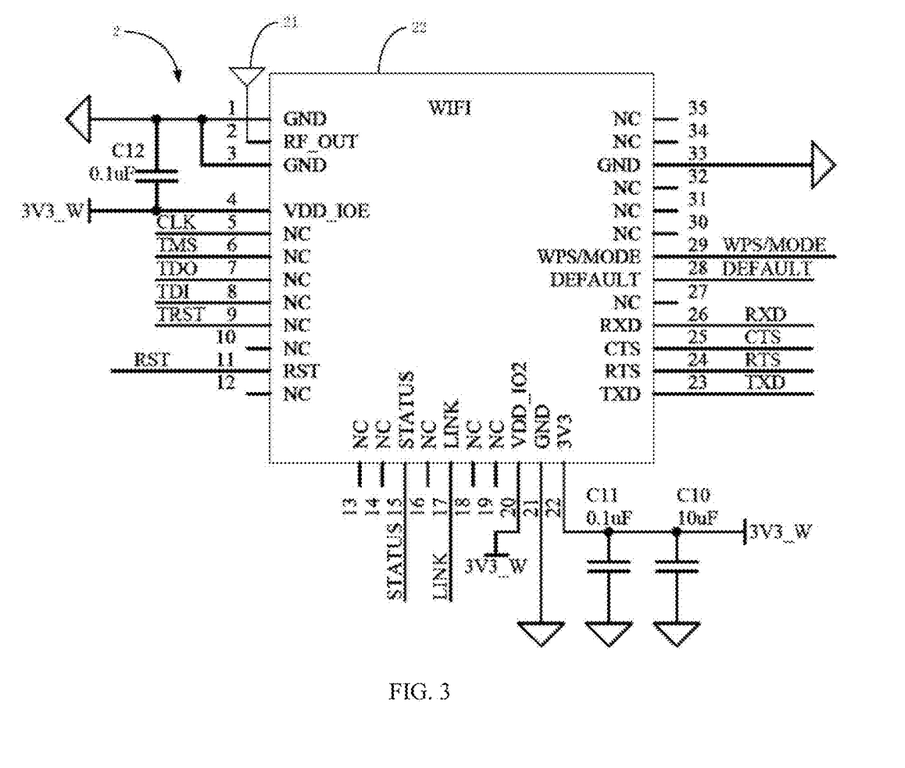
FIG. 3 is a schematic diagram of a WIFI module according to one embodiment of the present disclosure.

Referring to FIG. 3, FIG. 3 is a schematic diagram of the WIFI module 2 according to one embodiment of the present disclosure. The WIFI module 2 is electrically connected to the Bluetooth module 1. The WIFI module 2 includes a WIFI antenna 21 and a WIFI chip 22. The WIFI chip 22 includes a WIFI voltage regulation interface 3V3, a WIFI antenna interface RF_OUT, a WIFI asynchronous receive interface RXD, a WIFI asynchronous transmit interface TXD, and a test interface for burning a program. The WIFI voltage regulation interface 3V3 is electrically connected to the second voltage regulation circuit 5. The WIFI antenna interface RF_OUT is electrically connected to the WIFI antenna 21. The WIFI asynchronous receive interface RXD is connected to the Bluetooth asynchronous receive interface RXD. The WIFI asynchronous transmit interface TXD is connected to the Bluetooth asynchronous transmit interface TXD. The WIFI chip 22 further includes a protection mode interface (WPS/MODE), a default interface DEFAULT, and a reset interface RST. The WIFI chip 22 further includes a status interface STATUS and a link interface LINK. WIFI is connected to the processing unit 11 by CTS and RTS.

Figure 4:
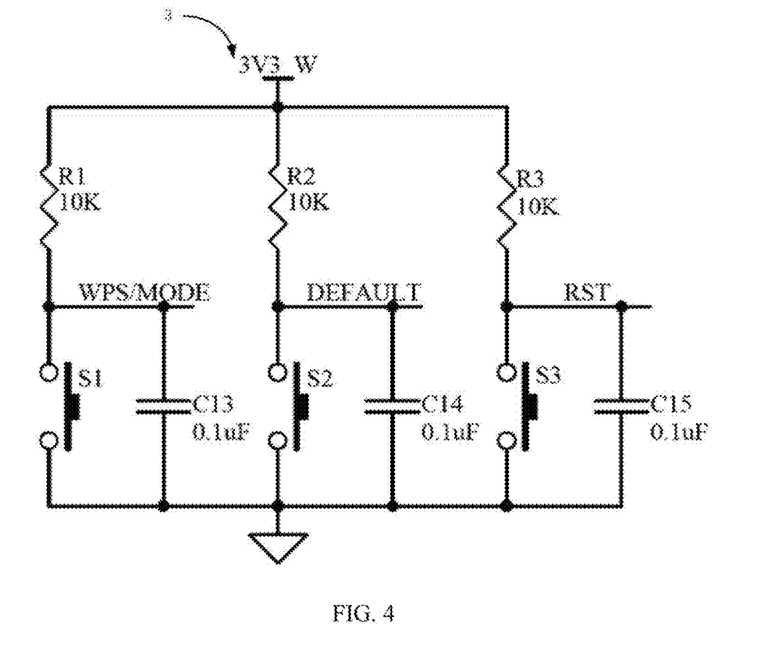
FIG. 4 is a schematic diagram of a switch circuit according to one embodiment of the present disclosure.

Referring to FIG. 4, FIG. 4 is a schematic diagram of the switch circuit 3 according to one embodiment of the present disclosure. The switch circuit 3 is electrically connected to the WIFI module 2. The switch circuit 3 includes a switch voltage regulation interface 3V3_W, a protection mode switch S1, a default switch S2, and a reset switch S3. The switch voltage regulation interface 3V3_W is connected to the second voltage regulation circuit 5. The protection mode switch S1 is connected to the switch voltage regulation interface 3V3_W and the protection mode interface WPS/MODE. The default switch S2 is connected to the switch voltage regulation interface 3V3_W and the default interface DEFAULT. The reset switch S3 is connected to the switch voltage regulation interface 3V3_W and the reset interface RST.

Figure 5:
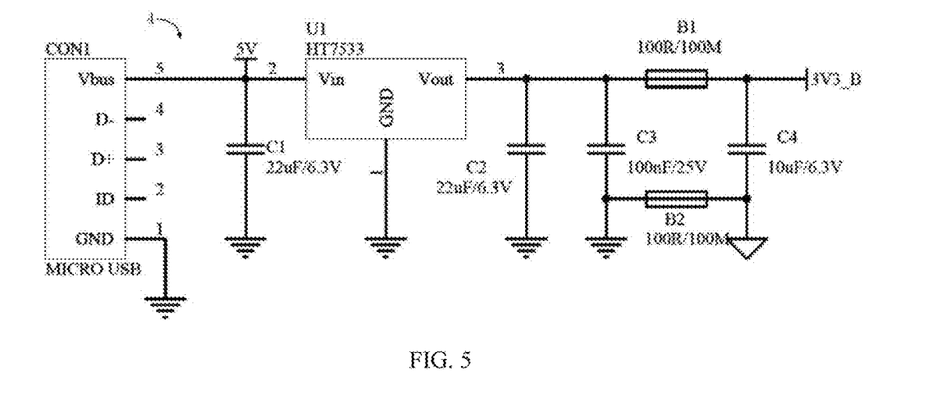
FIG. 5 is a schematic diagram of a first voltage regulation circuit according to one embodiment of the present disclosure.

Referring to FIG. 5, FIG. 5 is a schematic diagram of the first voltage regulation circuit 4 according to one embodiment of the present disclosure. The first voltage regulation circuit 4 is electrically connected to the Bluetooth module 1. The first voltage regulation circuit 4 includes a first voltage input interface 5V for accepting a predetermined voltage, a USB interface CON1, a first voltage regulator U1, a first protection circuit, and a first voltage output interface 3V3_B. The USB interface CON1 is electrically connected to the first voltage input interface 5V. The first voltage regulator U1 is electrically connected to the USB interface CON1 and the first voltage input interface 5V. The first protection circuit is electrically connected to the first voltage regulator U1. The first voltage output interface 3V3_B is electrically connected to first protection circuit and connected to the Bluetooth voltage regulation interface 3V3. The first protection circuit is composed by one fuse 131 and another fuse connected in parallel.

Figure 6:
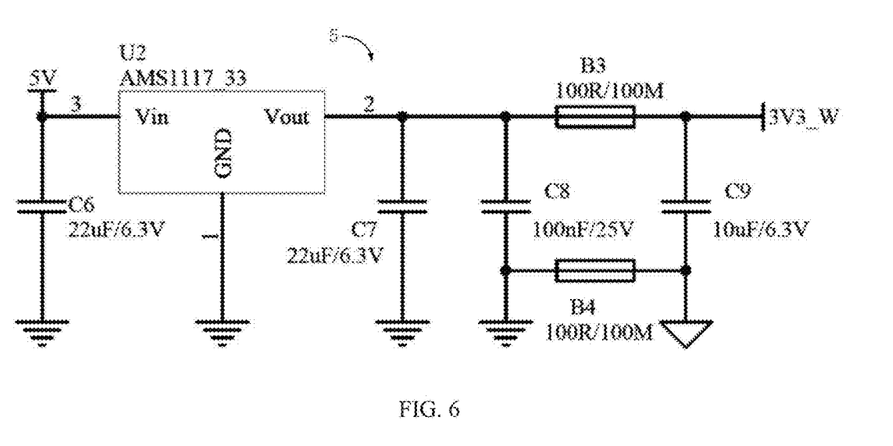
FIG. 6 is a schematic diagram of a second voltage regulation circuit according to one embodiment of the present disclosure.

Referring to FIG. 6, FIG. 6 is a schematic diagram of the second voltage regulation circuit 5 according to one embodiment of the present disclosure. The second voltage regulation circuit 5 is electrically connected to the WIFI module 2 and the switch circuit 3. The second voltage regulation circuit 5 includes a second voltage input interface 5V for connecting a predetermined voltage, a second voltage regulator U2, a second protection circuit, and a second voltage output interface 3V3_W. The second voltage regulator U2 is electrically connected to the second voltage input interface 5V. The second protection circuit is electrically connected to the second voltage regulator U2. The second voltage output interface 3V3_W is electrically connected to the second protection circuit and connected to the WIFI voltage regulation interface 3V3, the switch voltage regulation interface 2V3_W, and a voltage regulation terminal 3V3_W.

Figure 7:
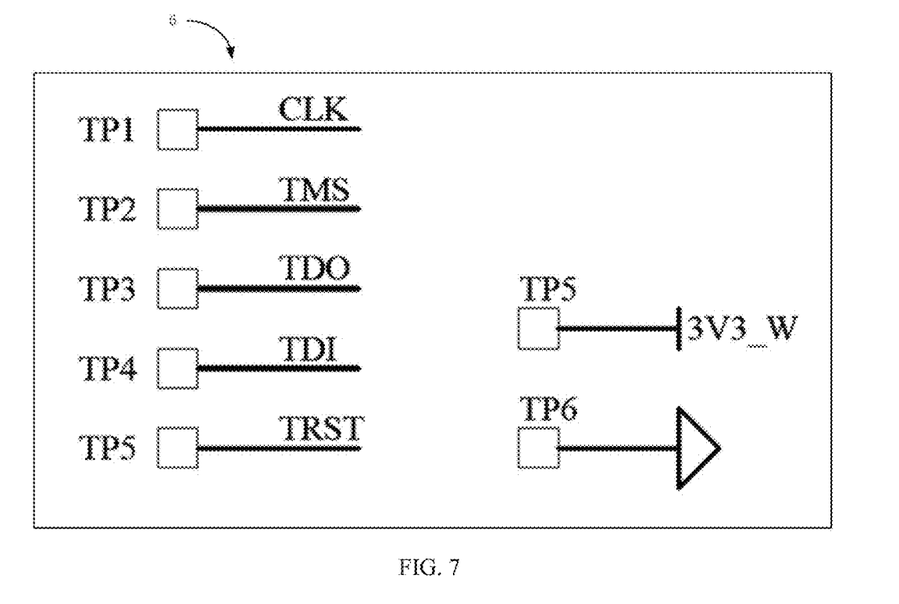
FIG. 7 is a schematic diagram of a test connection device according to one embodiment of the present disclosure.

Referring to FIG. 7, FIG. 7 is a schematic diagram of the test connection device 6 according to one embodiment of the present disclosure. The test interface includes a first clock terminal CLK, a first mode terminal TMS, a first data output terminal TDO, a first data input terminal TDI, and a first reset terminal TRST. The test connection device 6 includes a second clock terminal CLK, a second mode terminal TMS, a second data output terminal TDO, a second data input terminal TDI, and a second reset terminal TRST. The first dock terminal CLK is connected to the second clock terminal CLK. The first mode terminal TMS is connected to the second mode terminal TMS. The first data output terminal TDO is connected to the second data output terminal TDO. The first data input terminal TDI is connected to the second data input terminal TDI. The first reset terminal TRST is connected to the second reset terminal TRST. The test connection device 6 further includes the voltage regulation terminal 3V3_W.

Figure 8:
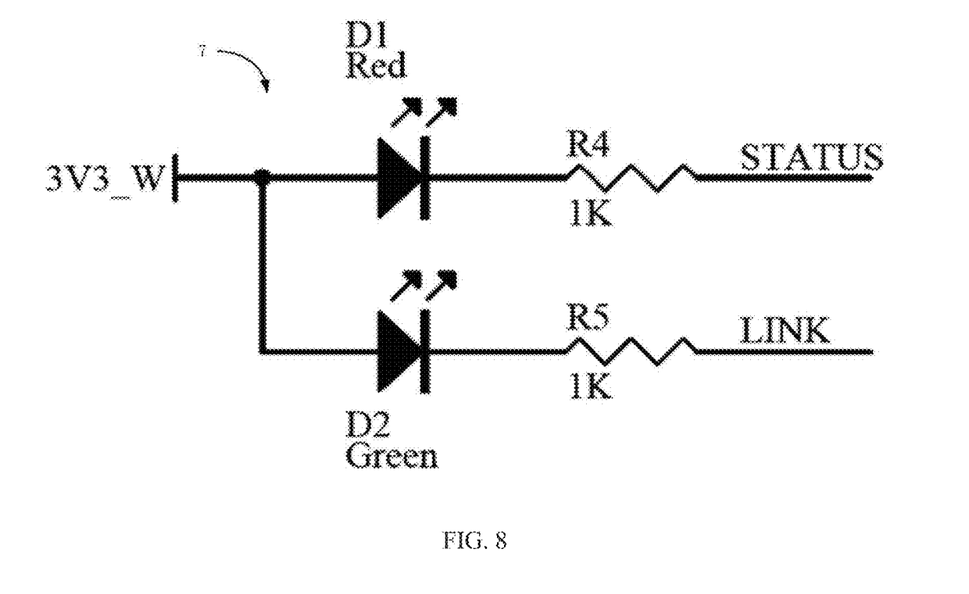
FIG. 8 is a schematic diagram of an indicator light module according to one embodiment of the present disclosure.

Referring to FIG. 8, FIG. 8 is a schematic diagram of the indicator light module 7 according to one embodiment of the present disclosure. The indicator light module 7 includes an indicator voltage regulation interface 3V3_W, a first indicator light D1, and a second indicator light D2. The indicator voltage regulation interface 3V3_W is electrically connected to the second voltage output interface 3V3_W. The first indicator light D1 is electrically connected to the indicator voltage regulation interface 3V3_W and the status interface STATUS. The second indicator light D2 is electrically connected to the indicator voltage regulation interface 3V3_W and the link interface LINK.

The present disclosure provides various operations for the embodiments. In one embodiment, one or more operations may constitute one or more computer-readable instructions stored in the computer-readable storage medium, which cause the computing device to perform the operations when be executed on the communication device. Some or all of the described sequence of operations should not be construed to imply that these operations are necessary to be dependent on the order. A person skilled in the art will appreciate that alternative orders may also have the advantages described in this specification. Moreover, it should be understood that not all of the operations must be presented in each of the embodiments provided herein.

Moreover, the word "preferred" used herein means serving as an embodiment, an illustration, or an example. As described herein, the term "preferred" is not necessary to be construed as any aspect or design superior to the other aspects or designs. Instead, the word exemplary manner is designed to specific concepts. In this application, the term "or" refers to an inclusive "or" rather than an exclusive "or." That is, unless specified otherwise, or clear from the context, "X using A or B" means any natural aimed inclusive replacement. That is, if X employs A; X employs B; or X employs both A and B, then "X using A or B" is satisfied by any of the aforementioned circumstances.

Furthermore, despite relative to one or more implementations shown and described in the present disclosure, the equivalent variations and modifications based on the present specification and drawings will occur to those skilled in the art upon reading and understanding. The present disclosure includes all such modifications and variations, and is only limited by the scope of the appending claims. Especially with regard to various functions performed by the above-described components elements, resources, etc.), the terms used to describe such components are intended to indicate any component (unless otherwise indicated) corresponding to a specified function (for example, that is functionally equivalent) performed by the described components, even though not structurally equivalent to the disclosed structure carrying out the functions in the exemplary implementations of the present disclosure described in the content text. In addition, although a particular feature of the present disclosure may have been disclosed with respect to one of several embodiments, this feature can be combined with one or more other features in the other embodiments which are expected or advantageous to any given or particular application. Moreover, the terms "including", "having", "with", or variants thereof used in the detailed description or the claims are intended to be used in a manner similar to the term "comprising".

Various functional units according to the embodiments of the present disclosure may be integrated in one processing module or may exist as various separate physical units, or two or more units may be integrated in one module. The integrated module may be implemented through hardware, or may also be implemented in a form of a software functional module. When the integrated module is implemented in the form of the software functional module and sold or used as a separate product, the integrated module may also be stored in a computer readable storage medium. The storage medium may be a read only memory, a magnetic disk, an optical disk, or the like. The devices or systems may execute the method in the corresponding method embodiment.

Finally, the above descriptions are merely exemplary embodiments of the present disclosure, but not intended to limit the present disclosure. Any modification, equivalent replacement, or improvement made without departing from the spirit and principle of the present disclosure should fall within the protection scope of the present disclosure.

What is claimed is:

1. A Bluetooth WIFI gateway device comprising:
   a Bluetooth module;
   a WIFI module electrically connected to the Bluetooth module;
   a switch circuit electrically connected to the WIFI module;
   a first voltage regulation circuit electrically connected to the Bluetooth module; and
   a second voltage regulation circuit electrically connected to the WIFI module and the switch circuit,
   wherein the Bluetooth module comprises:
   a processing unit;
   a Bluetooth chip comprising a Bluetooth voltage regulation interface, a processing unit interface, a Bluetooth asynchronous receive interface, and a Bluetooth asynchronous transmit interface, wherein the Bluetooth voltage regulation interface is electrically connected to the first voltage regulation circuit, the Bluetooth asynchronous receive interface and the Bluetooth asynchronous transmit interface are electrically connected to the WIFI module, and the processing unit interface is electrically connected to the processing unit, and
   wherein the first voltage regulation circuit comprises:

a first voltage input interface for receiving a predetermined voltage;
a USB interface electrically connected to the first voltage input interface;
a first voltage regulator electrically connected to the USB interface and the first voltage input interface;
a first protection circuit electrically connected to the first voltage regulator; and
a first voltage output interface electrically connected to the first protection circuit and connected to the Bluetooth voltage regulation interface.

2. The Bluetooth WIFI gateway device of claim 1, wherein the WIFI module comprises:
a WIFI antenna;
a WIFI chip comprising a WIFI voltage regulation interface, a WIFI antenna interface, a WIFI asynchronous receive interface, a WIFI asynchronous transmit interface, and a test interface for burning a program, wherein the WIFI voltage regulation interface is electrically connected to the second voltage regulation circuit, the WIFI antenna interface is electrically connected to the WIFI antenna, the WIFI asynchronous receive interface is connected to the Bluetooth asynchronous receive interface, and the WIFI asynchronous transmit interface is connected to the Bluetooth asynchronous transmit interface.

3. A Bluetooth WIFI gateway device comprising:
a Bluetooth module;
a WIFI module electrically connected to the Bluetooth module;
a switch circuit electrically connected to the WIFI module;
a first voltage regulation circuit electrically connected to the Bluetooth module; and
a second voltage regulation circuit electrically connected to the WIFI module and the switch circuit; and
a test connection device,
wherein the Bluetooth module comprises:
a processing unit;
a Bluetooth chip comprising a Bluetooth voltage regulation interface, a processing unit interface, a Bluetooth asynchronous receive interface, and a Bluetooth asynchronous transmit interface, wherein the Bluetooth voltage regulation interface is electrically connected to the first voltage regulation circuit, the Bluetooth asynchronous receive interface and the Bluetooth asynchronous transmit interface are electrically connected to the WIFI module, and the processing unit interface is electrically connected to the processing unit,
wherein the WIFI module comprises:
a WIFI antenna;
a WIFI chip comprising a WIFI voltage regulation interface, a WIFI antenna interface, a WIFI asynchronous receive interface, a WIFI asynchronous transmit interface, and a test interface for burning a program, wherein the WIFI voltage regulation interface is electrically connected to the second voltage regulation circuit, the WIFI antenna interface is electrically connected to the WIFI antenna, the WIFI asynchronous receive interface is connected to the Bluetooth asynchronous receive interface, and the WIFI asynchronous transmit interface is connected to the Bluetooth asynchronous transmit interface, and
the test interface comprises a first clock terminal, a first mode terminal, a first data input terminal, a first data output terminal, and a first reset terminal,
the test connection device comprises a second clock terminal, a second mode terminal, a second data input terminal, a second data output terminal, and a second reset terminal,
the first clock terminal is connected to the second clock terminal, the first mode terminal is connected to the second mode terminal, the first data input terminal is connected to the second data input terminal, the first data output terminal is connected to the second data output terminal, and the first reset terminal is connected to the second reset terminal.

4. A Bluetooth WIFI gateway device comprising:
a Bluetooth module;
a WIFI module electrically connected to the Bluetooth module;
a switch circuit electrically connected to the WIFI module;
a first voltage regulation circuit electrically connected to the Bluetooth module; and
a second voltage regulation circuit electrically connected to the WIFI module and the switch circuit,
wherein the Bluetooth module comprises:
a processing unit;
a Bluetooth chip comprising a Bluetooth voltage regulation interface, a processing unit interface, a Bluetooth asynchronous receive interface, and a Bluetooth asynchronous transmit interface, wherein the Bluetooth voltage regulation interface is electrically connected to the first voltage regulation circuit, the Bluetooth asynchronous receive interface and the Bluetooth asynchronous transmit interface are electrically connected to the WIFI module, and the processing unit interface is electrically connected to the processing unit,
wherein the WIFI module comprises:
a WIFI antenna;
a WIFI chip comprising a WIFI voltage regulation interface, a WIFI antenna interface, a WIFI asynchronous receive interface, a WIFI asynchronous transmit interface, and a test interface for burning a program, wherein the WIFI voltage regulation interface is electrically connected to the second voltage regulation circuit, the WIFI antenna interface is electrically connected to the WIFI antenna, the WIFI asynchronous receive interface is connected to the Bluetooth asynchronous receive interface, and the WIFI asynchronous transmit interface is connected to the Bluetooth asynchronous transmit interface, and
wherein the WIFI module further comprises a protection mode interface, a default interface, and a reset interface, the switch circuit comprises:
a switch voltage regulation interface connected to the second voltage regulation circuit;
a protection mode switch connected to the switch voltage regulation interface and the protection mode interface;
a default switch connected to the switch voltage regulation interface and the default interface; and
a reset switch connected to the switch voltage regulation interface and the reset interface.

5. The Bluetooth WIFI gateway device of claim 4, wherein the test connection device further comprises a voltage regulation terminal, the second voltage regulation circuit comprises:
a second voltage input interface for receiving the predetermined voltage;
a second voltage regulator electrically connected to the second voltage input interface;

a first protection circuit electrically connected to the second voltage regulator; and a second voltage output interface electrically connected to the second protection circuit and connected to the WIFI voltage regulation interface, the switch voltage regulation interface, and the voltage regulation terminal.

6. The Bluetooth WIFI gateway device of claim 5, further comprising an indicator light module, wherein the WIFI chip further comprises a status interface and a link interface, the indicator light module comprises:

an indicator voltage regulation interface electrically connected to the second voltage output interface;

a first indicator light electrically connected to the indicator voltage regulation interface and the status interface; and a second indicator light electrically connected to the indicator voltage regulation interface and the link interface.

* * * * *